Figure 1:
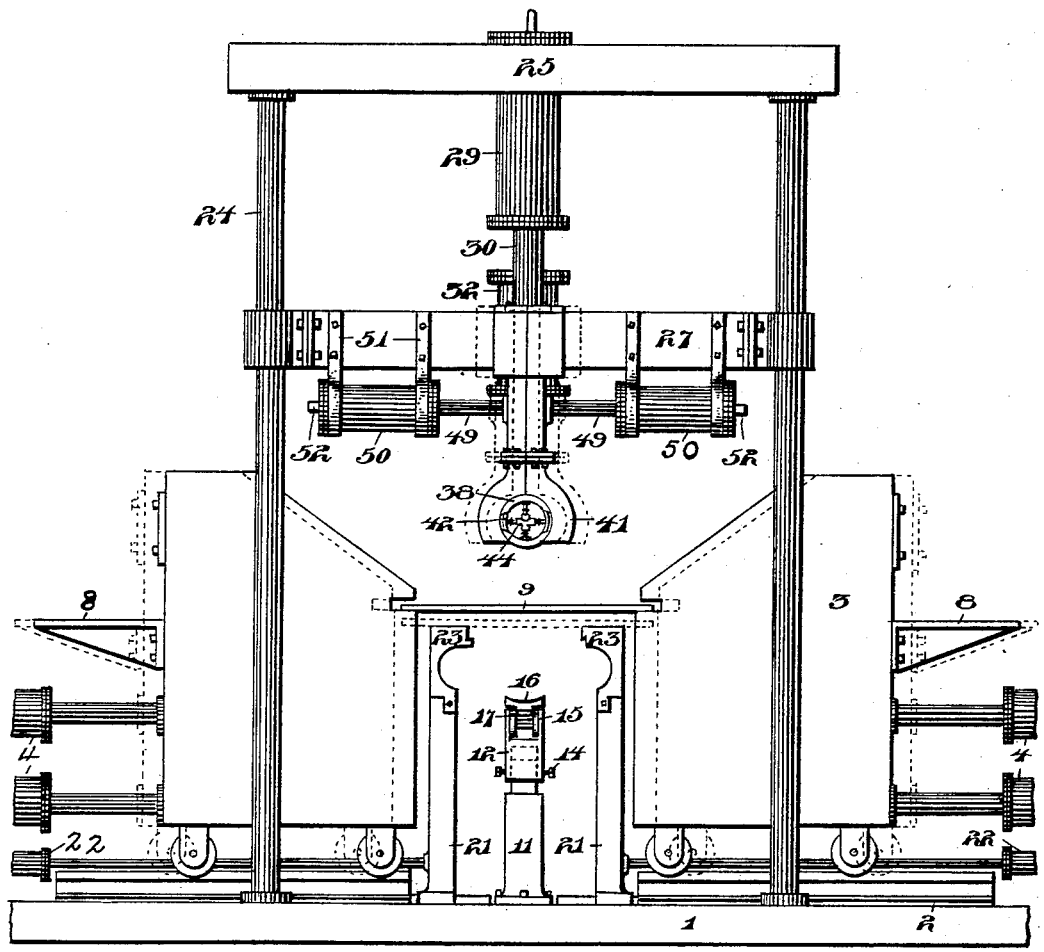

No. 653,961. Patented July 17, 1900.
W. KLINEFELTER.
PIPE WELDING MACHINE.
(Application filed Jan. 3, 1900.)

(No Model.) 4 Sheets—Sheet 1.

WITNESSES:
INVENTOR
W. Klinefelter.
BY
ATTORNEYS.

No. 653,961. Patented July 17, 1900.
W. KLINEFELTER.
PIPE WELDING MACHINE.
(Application filed Jan. 3, 1900.)

(No Model.) 4 Sheets—Sheet 2.

WITNESSES:
INVENTOR
W. Klinefelter.
BY
ATTORNEYS.

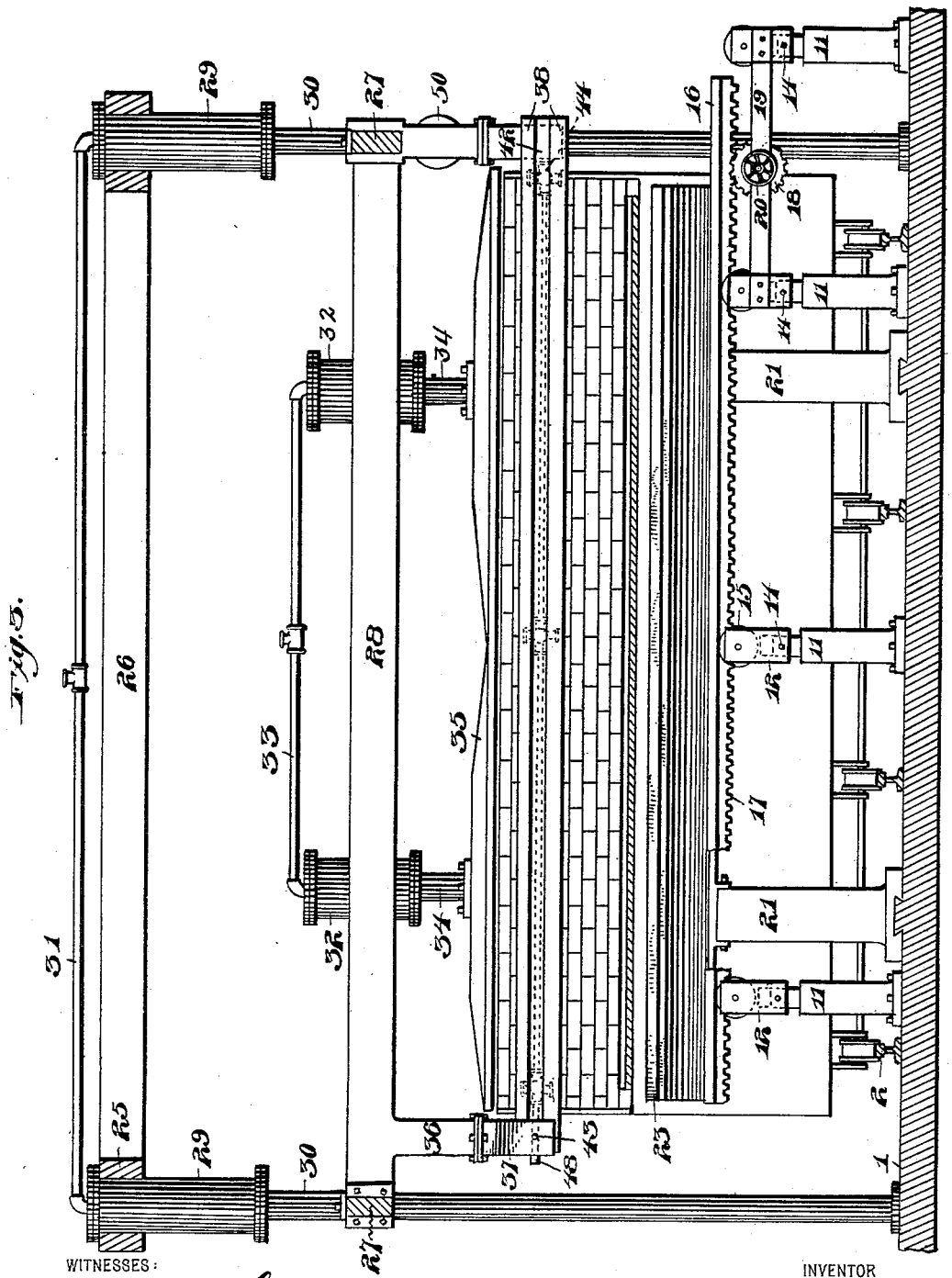

No. 653,961. Patented July 17, 1900.
W. KLINEFELTER.
PIPE WELDING MACHINE.
(Application filed Jan. 3, 1900.)
(No Model.) 4 Sheets—Sheet 4.
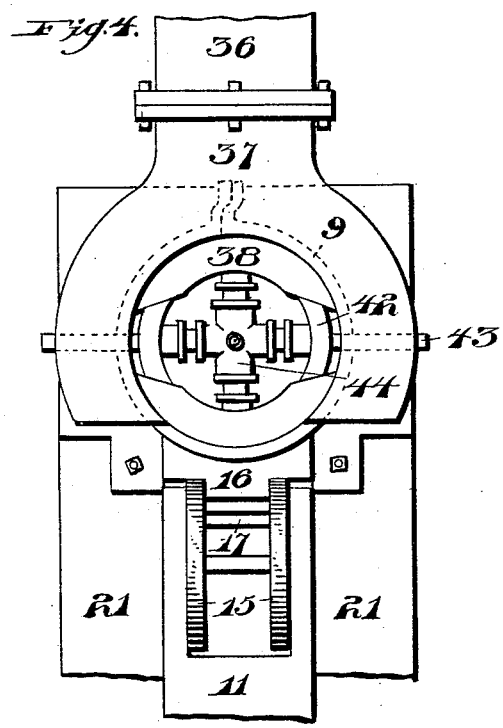
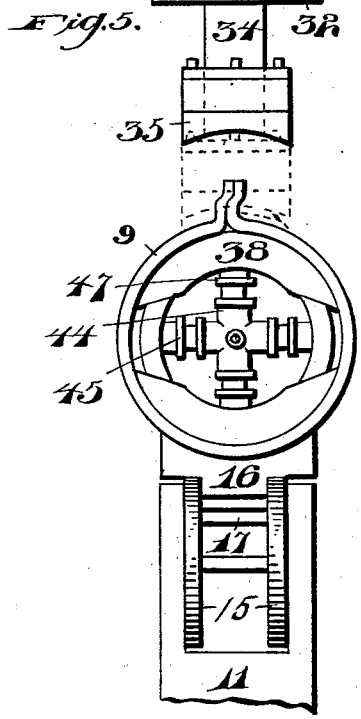
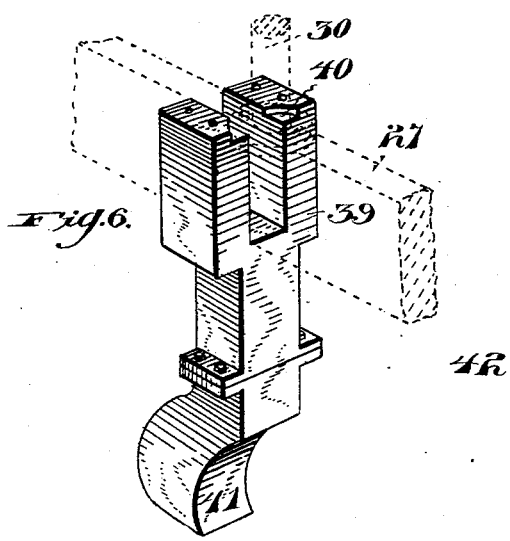
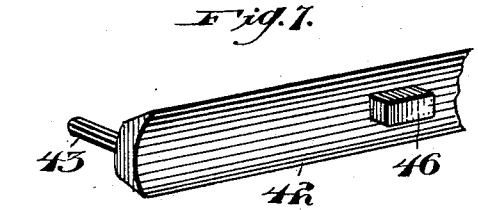
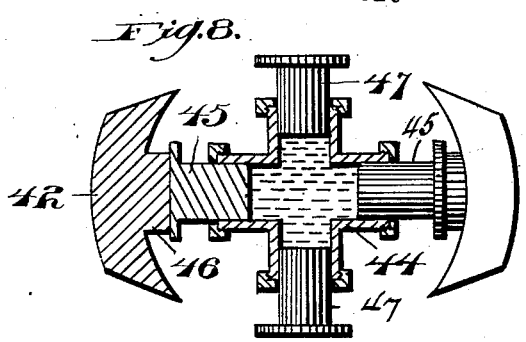
WITNESSES:
INVENTOR
W. Klinefelter.
BY
ATTORNEYS.
THE NORRIS PETERS CO., PHOTO-LITHO., WASHINGTON, D. C.

UNITED STATES PATENT OFFICE.

WILLIAM KLINEFELTER, OF PITTSBURG, PENNSYLVANIA.

PIPE-WELDING MACHINE.

SPECIFICATION forming part of Letters Patent No. 653,961, dated July 17, 1900.

Application filed January 3, 1900. Serial No. 212. (No model.)

*To all whom it may concern:*

Be it known that I, WILLIAM KLINEFELTER, a citizen of the United States of America, residing at Pittsburg, in the county of Allegheny and State of Pennsylvania, have invented certain new and useful Improvements in Pipe-Welding Machinery, of which the following is a specification, reference being had therein to the accompanying drawings.

My invention relates to certain new and useful improvements in metal-tube mills, and is particularly adapted for forming tubes from cold-steel plates heated only at their edges to be welded.

In various methods now in general use for forming metal tubes from plates the plates are entirely heated and then welded together in the form of a cylinder. This entire heating of the plate to form a tube destroys to a great extent its durability as well as the strength of the steel after the tube is formed. Therefore the object of my invention is to form metal tubes from steel plates which may be more durable and possess greater strength than the majority of tubes now manufactured, and this object I obtain by heating only the edges of the plate to be welded, thereby overcoming the objectionable features contained in tubes manufactured and now in general use, as above stated.

A further object of my invention is to construct a mill of this character which will be simple in construction, strong, durable, efficient in its use, and comparatively inexpensive to set up.

Briefly described, my invention consists of a pair of movable furnaces for heating the edges of the steel plate to be formed into a tube, as well as to support the plate before the welding operation, a mandrel operating against the inner face of the plate, and a pair of longitudinally-operating presses, the mandrel and presses forming the plate into a tube or cylinder, and a vertically-operating press for welding the meeting edges of the cylinder or tube together, and means for removing the tube from the mill after its completion.

With the above and other objects in view my invention finally consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 2:
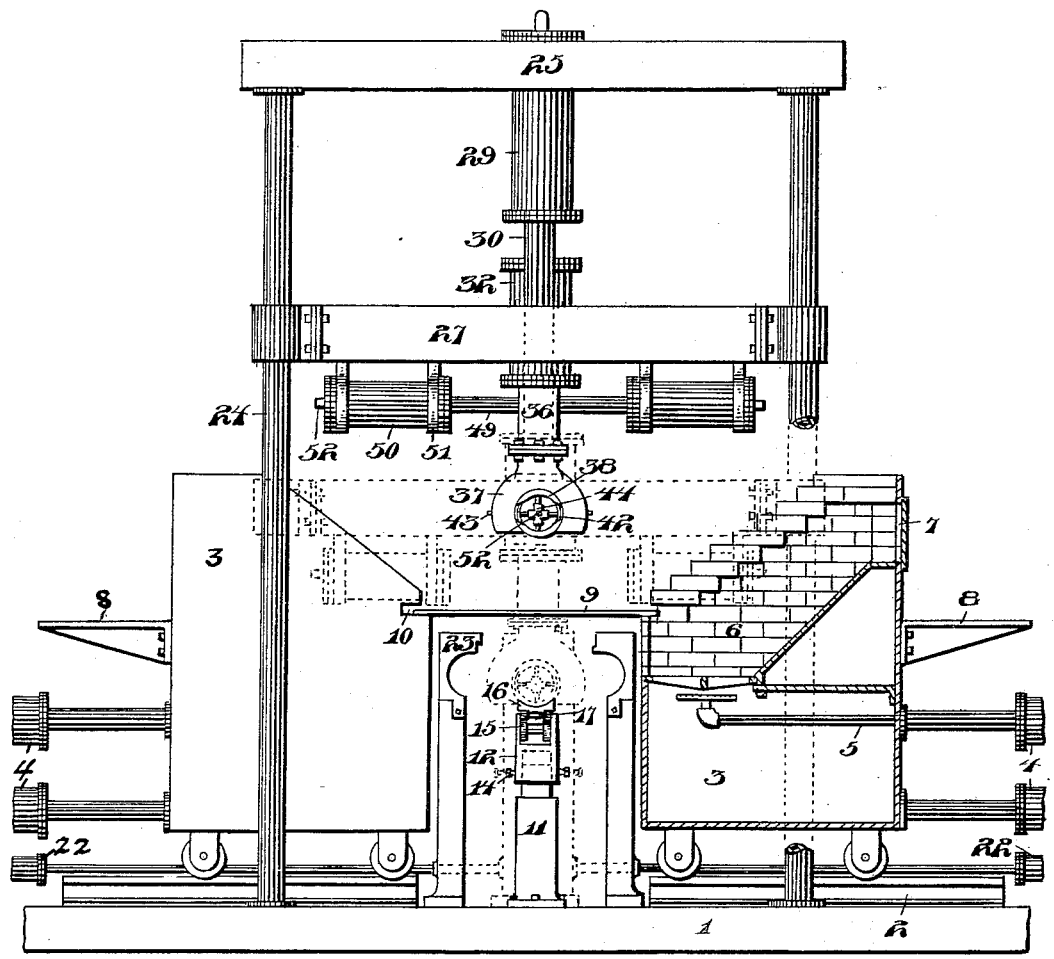

Figure 1 is an end view of my improved mill. Fig. 2 is a rear view thereof, partly in section. Fig. 3 is a vertical longitudinal sectional view thereof. Fig. 4 is a view of one end of the mandrel and its connections. Fig. 5 is a view of one end of the press and mandrel, showing the tube or cylinder formed on the mandrel with the edges of the tube or cylinder yet to be welded by the press. Fig. 6 is a perspective view of one member of the rear supporting-hanger for the mandrel. Fig. 7 is a perspective view of one of the mandrel-sections partly broken away. Fig. 8 is a front plan view of one series of the hydraulic pistons for operating the sections of the mandrel.

Referring to the drawings by reference-numerals, 1 indicates a suitable base upon which are arranged the tracks 2 for the moving furnaces 3. These furnaces are so arranged as to move upon their tracks transversely of the mill and to support a steel plate with its edges in position to be heated. The furnaces are moved upon their tracks by connecting to the sides of each furnace one or more hydraulic cylinders 4, and the edges of the plate are brought to a welding heat by means of a blast 5, connecting with each furnace, with its discharge directly underneath the combustion-chamber 6, into which the edges of the plate project. Each of the combustion-chambers is provided with a suitable charging-port 7, below which is arranged a table or support 8.

The plates 9 from which the tube or cylinder is formed are supported upon the inner walls of the furnaces, as shown in Figs. 1 and 2 of the drawings. The front walls of said furnaces may, if desired, be notched, as shown at 10, to receive said plates. Arranged upon the base 1 and supported thereby between the two furnaces are a number of standards 11, having vertically-operating supports 12 therein, said supports being held in the desired position by means of set-screws 14. These supports 12 have journaled in their upper ends a pair of wheels 15 and also carry a die or bed plate 16, which is concave on its upper face and is adapted to receive the plate 9 when the latter is forced downwardly by the vertically-operating press, as will be hereinafter described. This die or bed plate 16 is provided on its under face with a cog-rack 17 and is operated so as to move the finished tube or cylinder from out of the mill by means of the gear or pinion wheel 18, meshing with said rack, and which is supported by a shaft journaled in a pair of braces or cross-bars 19, connected to the vertically-moving supports 12. The shaft which carries the gear or pinion wheel 18 is provided on its one end with a suitable hand or operating wheel 20, and by reason of the supports which carry this shaft and wheel being connected to the vertically-moving supports 12 the wheel will always be in mesh with the gear or cog rack 17 as the said supports 12 are elevated or lowered.

Arranged upon the base 1 between the two furnaces are two pairs of standards 21, which are dovetailed at their lower ends on said base, so as to slide thereon, and are movable toward and away from each other. These standards are moved by connecting thereto one or more hydraulic cylinders 22, and have pivoted to the upper ends thereof a pair of formers 23, concave on their inner face and of especial construction on their meeting edges for the purpose of compressing the heated edges of the plates together in a manner to permit of the same being welded by the vertically-operating press.

At the front of the furnaces and also at the rear of the same is arranged a pair of vertical uprights 24, each pair connected at its upper end by a cross-piece 25, which cross-pieces 25 are connected together longitudinally of the mill by a cross-head 26. Each pair of the uprights 24 is also connected together by cross-heads 27, which are adapted to slide vertically upon the said uprights 24 and which in turn are connected longitudinally of the mill by the cross-head 28, that supports the mandrel upon which the tube or cylinder is formed. Each of the cross-pieces 25 has arranged therein and supports hydraulic cylinders 29, the pistons 30 of which are connected to the cross-heads 27. The cylinders 29 communicate with a common pressure-supply source 31. Arranged in the cross-head 28 and supported thereby is a pair of hydraulic cylinders 32, communicating with a common pressure-supply source 33, and the pistons 34 of which are connected to a vertically-operating welding-press 35.

The cross-head 28 is provided near its rear end with a hanger-arm 36, to which is attached a hanger 37, which supports the mandrel at its rear end. This mandrel 38 consists of two pieces, and at the forward end of the mill it is supported by a hanger comprising two members which are separable in order to permit the two members of the mandrel being moved apart at this end and the withdrawal of the finished tube or cylinder. In Fig. 6 I have shown one member of the hanger which supports the mandrel at the front of the mill, both members being alike and consisting of a yoke 39, which is adapted to receive the cross-head 27 at the front of the mill and to which it is secured by the plate attached to the top of the yoke over the said cross-head. This yoke on its upper face is provided with recesses 40, which permit the pistons 30 at the front of the mill to engage directly against the hanger when pressure is applied for operating the press 35. Connected to the yokes 39 are the clamp members 41, which engage the periphery of the members of the mandrel and hold the same while forming the tube or cylinder. The members or sections are spread or forced apart by means of a pair of thrust-bars 42, provided at their rear ends with pins 43, which engage through the hanger 37 and hold the said bars. Arranged within the mandrel, preferably near the rear end thereof, near the front end thereof, and also at or about the center thereof, is a four-way hydraulic valve or pressure cylinder 44, the two pistons 45 of which operate against the bearing-blocks 46 on the concave faces of the thrust-bars, while the two pistons 47 operate directly against the said concave faces of the thrust-bars. Each of the three hydraulic valves or casings 44 have a common source of pressure-supply 48.

The two members comprising the hanger at the front of the machine are separated after the tube or cylinder has been formed, so as to permit the removal of the tube or cylinder from the mandrel, and this I also accomplish by hydraulic pressure by means of the pistons 49, connected one to each of said members and operating in the pressure-cylinders 50, which are supported from the front cross-head 27 by brackets or hangers 51, attached thereto. These cylinders 50 have a common source of pressure-supply 52.

The operation of my improved mill is as follows: The plate 9 is placed in position on the furnaces, as shown in Figs. 1 and 2 of the drawings, with its edges projecting into the combustion-chambers 6 of the furnaces, so that said edges may be brought to the welding heat. When this heat of the edges has been attained, the valve is opened to admit pressure into the supply-pipe 31 and operate the pistons 30 of the cylinders 29. These pistons force the cross-heads 27 downwardly, lowering therewith the mandrel and bringing the latter into contact with the plate 9, which is bent around the mandrel as the latter continues to descend until the movement is arrested by contact with the die or bed plate 16. At this point of the operation pressure is admitted to the cylinders 22 to operate the vertical standards 21, moving the latter toward each other and causing the formers 23 to engage the sides of the plate and complete the operation of forming the same into a tube or cylinder, its ends being brought together in the manner shown in Fig. 5 of the drawings.

When in this position, the valve is opened to admit pressure to the supply-pipe 33, causing the pistons 34 of the cylinders 32 to force the press 35 downwardly against the edges of the tube or cylinder which has just been formed and firmly weld the said edges, at which time the tube or cylinder is completed. In order to remove the tube or cylinder from the mandrel, the two members of the hanger at the front of the machine are now separated, which relieves the pressure of the thrust-bars 42 against the sections or members 38 comprising the mandrel, and the tube being supported upon the die or bed plate 16 the latter is then operated by the hand-wheel 20 and gear or pinion 18, engaging the cog or rack-bar 17 of the said die or bed-plate, moving the same outward at the front of the machine and carrying the tube or finished cylinder therewith. By reason of the thrust-bars 42 being supported at the rear of the machine by the pins 43 engaging in the hanger 37 these bars are held in such a manner that when the mandrel is again lowered and the pressure is admitted to the four-way hydraulic valve or cylinder 44 the thrust-bars will be readily forced into engagement with the members 38 of the mandrel, as heretofore described.

While, as herein stated, the object of this invention is to produce a tube, pipe, or cylinder from a cold-metal plate, yet it will be readily apparent that the plates, if desired, may be heated to a certain extent before being placed in position upon the ovens for heating the edges thereof, so as to somewhat assist the mandrel in forming the plate into a tube, pipe, or cylinder. Such heating of the plate may, it is obvious, be attained by a furnace of any ordinary construction suitably arranged so that the plate may be transferred from such heating-furnace to the furnaces of the mill.

Having thus fully described my invention, what I claim as new, and desire to secure by Letters Patent, is—

1. The combination with a pair of transversely-moving furnaces adapted to support a steel plate and a die or bed plate arranged between the same, of a vertically-operating mandrel adapted to engage said plate and form the same into a tube or cylinder, a pair of formers arranged between said furnaces and engaging said tube when operated upon by said mandrel, and means for welding the meeting edges of said tube or cylinder together, substantially as described.

2. In a tube-mill, a die or bed plate, a furnace arranged at each side thereof and supporting the welding edges of a cold-steel plate, a vertically-operating mandrel, a pair of transversely-operating formers, said formers and mandrel adapted to engage said plate and form the same into a tube or cylinder, a vertically-operating press for welding the meeting edges of said tube or cylinder together, and means for removing said tube or cylinder from the mandrel, substantially as described.

3. In a tube-mill, a base, a supporting-frame mounted thereon, a vertically-operating mandrel connected thereto, a vertically-operating press connected to said frame, a pair of transversely-operating formers mounted upon said base, a die or bed plate arranged between said formers, means for supporting the said die or bed plate, and a furnace arranged at one side of each of the said formers and adapted to support the welding edges of the steel plate which is operated upon by the said mandrel, formers, and press, for forming the same into a tube or cylinder, substantially as described.

4. In a tube-mill, a base, a supporting-frame mounted thereon, a vertically-operating mandrel connected thereto, a vertically-operating press connected to said frame, a pair of transversely-operating formers mounted upon said base, a die or bed plate arranged between said formers, means for supporting the said die or bed plate, a furnace arranged at one side of each of the said formers and adapted to support and heat the edges of a steel plate which is operated upon by said mandrel, said formers, and said press, for forming the same into a tube or cylinder, and means suitably arranged upon said base for removing said tube or cylinder from the mandrel, substantially as described.

5. In a tube-mill, a suitably-supported mandrel consisting of two separable members adapted to form a plate into a tube or cylinder, means for spreading said mandrel, and means connected to the mandrel for vertically operating the same, combined with formers adapted to engage the plate in connection with the mandrel, and means for operating said formers.

6. In a tube-mill, a mandrel consisting of two members and carrying means for spreading the same and adapted to form a plate into a tube or cylinder, a pair of hangers arranged in said mill and adapted to support said mandrel, means connected to said hangers for vertically operating said mandrel, and means connected to one of said hangers for moving the same from the said mandrel to permit of the removal of the tube or cylinder after the same has been formed, substantially as herein shown and described.

7. In a tube-mill, a mandrel consisting of two members and carrying means for spreading the same and adapted to form a plate into a tube or cylinder, a pair of hangers arranged in said mill and adapted to support said mandrel, means connected to said hangers for vertically operating said mandrel, a pair of transversely-operating formers adapted to engage said plate in connection with said mandrel, and a vertically-operating press adapted to weld the meeting edges of said tube or cylinder after the same has been formed by the mandrel and formers, substantially as herein shown and described.

8. In a tube-mill, a mandrel consisting of two members and carrying means for spreading the same and adapted to form a plate into a tube or cylinder, a pair of hangers arranged in said mill and adapted to support said mandrel, means connected to said hangers for vertically operating said mandrel, a pair of transversely-operating formers adapted to engage said plate when the latter is operated upon by said mandrel, a vertically-operating press adapted to weld the meeting edges of said tube or cylinder after the same has been formed by the mandrel and formers, and means for removing said tube or cylinder from said mandrel, substantially as herein shown and described.

9. In a tube-mill, a pair of transversely-moving furnaces adapted to support a steel plate and provided with a suitable blast for heating the edges of said plate to permit of the welding of the same together, a vertically-operating mandrel, a pair of transversely-operating formers, said mandrel and said formers adapted to engage said plate to form the same into a tube or cylinder, and means for welding the heated edges of the said plate when brought together, substantially as described.

10. In a tube-mill, a pair of transversely-moving furnaces adapted to support a steel plate and provided with a suitable blast for heating the edges of said plate to permit of the welding of the same together, a vertically-operating mandrel, a pair of transversely-operating formers, said mandrel and said formers adapted to engage said plate to form the same into a tube or cylinder, a vertically-operating press for welding the heated edges of the said plate when brought together, and means arranged in said mill for removing the said tube or cylinder from the mandrel, substantially as herein shown and described.

In testimony whereof I affix my signature in the presence of two witnesses.

WILLIAM KLINEFELTER.

Witnesses:
JOHN NOLAND,
WILLIAM E. MINOR.